UNITED STATES PATENT OFFICE.

AUGUST E. NIENSTADT, OF BENSONHURST, NEW YORK.

PLASTIC COMPOSITION AND METHOD OF MAKING THE SAME.

1,295,356.          Specification of Letters Patent.      Patented Feb. 25, 1919.

No Drawing.      Application filed November 20, 1916. Serial No. 132,295.

*To all whom it may concern:*

Be it known that I, AUGUST E. NIENSTADT, a citizen of the United States of America, and a resident of Bensonhurst, county of Kings, and State of New York, have invented certain new and useful Improvements in Plastic Composition and Methods of Making the Same, of which the following is a specification.

This invention has reference to a novel composition of matter to be used in the arts, trades and industries as a material for producing various kinds of articles such as are made for instance of shellac compositions, bakelite and the like.

The novel composition is prepared from organic substances, it is of agreeable touch and relatively light in weight. It is water repellent, does not conduct electricity and becomes hard after molding. Accordingly the composition is well adapted for producing all kinds of insulating articles for the electric arts and for telephone parts such as receivers and transmitters. Further phonograph records in the form of disks and cylinders may be made therefrom as well as rollers for player pianos. Various kinds of fancy articles such as pin trays and bowls, hair receivers and ornamental parts of fancy designs are conveniently molded from the novel composition as well as buttons and molds for garments. Plates, rods and strips may also be made therefrom to be used as a material in various arts for all kinds of small ornamental articles.

The novel composition is essentially composed of vegetable fiber, paraffin and resinous substances, such as the copals, shellac and the like. If paraffin is melted together with resinous substances, such as shellac, copal, amber and the like they separate and do not form a fused homogeneous mass, each melting by itself. In order to utilize these substances for an artificial composition means had to be found to unite them during melting. I have discovered that any kind of vegetable fiber incorporated with the paraffin or the paraffin and finely powdered resinous substance results in a perfectly uniform homogeneous mass when melted together. Cotton, linen, paper pulp fiber and the like may be employed which is preferably first incorporated with the paraffin. Finely powdered resinous substance may be directly mixed with the melted mass of fiber and paraffin. The resulting mixture is heated and stirred until a uniform homogeneous composition is obtained. The mass of paraffin and fiber incorporated therein also may be allowed to cool. It is then reduced to small particles and the finely powdered resinous substance intimately mixed therewith and the entire mixture heated and stirred until the perfectly uniform and homogeneous composition results.

For the purpose of producing a relatively cheap composition I prefer to make use of waste paraffin paper of all descriptions in place of a specially prepared mass of vegetable fiber and paraffin. This reduces the cost considerably and paraffin waste paper is plentifully at disposal. For instance the small sanitary drinking cups which are purposed to be used but once and thrown away are made of paraffin paper. The cups accordingly are composed of vegetable fiber, that is paper pulp fiber, and paraffin. The cups or other paraffin waste papers are first shredded so as to form comminuted particles which are conveniently mixed with the fine powder of resinous substances and the mixture is then placed into a heated mold and compressed preferably by hydraulic pressure to form directly the desired article.

As herein stated various kinds of resinous substances and also gums may be employed. For certain compositions shellac for instance may be used which melts at moderate heat. The resulting composition possesses all the required properties and may easily be molded into commercial articles which however do not resist a high degree of heat. The copals, on the contrary, are chiefly fossil resins and of relatively high fusion point. During melting, for instance, of shredded paraffin waste paper with fine copal powder proper care has to be taken to avoid excessive temperatures so as to prevent charring of the fiber. If copal powder and fiber alone would be employed the charring of the fiber would be imminent. If however the fiber is melted together with the low fusing paraffin as in the paraffin waste paper then the charring does not take place when copal powder is employed in the properly conducted process. It is evident that a composition prepared with copal powder is much harder than a composition prepared with shellac or common rosin which latter may even be fused together with paraffin to form a rather uniform mass evidently due to the presence of some hydrocarbons therein. The compositions made with copals further are more water repellent than compositions prepared with shellac. The first mentioned compositions resist atmospheric moisture to which finished goods are often exposed in a perfect manner while shellac compositions, if constantly exposed to moisture may show the effects therefrom on the surface. Goods from shellac compositions are better adapted for indoor use while goods from copal compositions may be used both indoors and outdoors.

The proportions in which the ingredients for the composition are mixed may vary according to requirements. For certain goods 75% of shredded paraffin waste paper may be mixed with 25% of shellac or copals. For other goods which are harder and resist atmospheric influences to any degree the percentage of copals for instance may be raised up to 50%. Owing to the difference in price at present existing between shellac and copals the latter are preferred for economic reasons. Thus the vegetable fiber acts as a binding medium for the paraffin, shellac or resinous substance.

For certain applications the novel composition may be loaded with a filler. For heavy compositions sulfate of barium may be incorporated and the lighter compositions carbonate of calcium or silicates. In certain instances metallic oxids may be admixed with the composition for instance the ferric oxids or even magnesium oxid. These fillers further impart certain shades and tints of color to the composition and coloring substances may be admixed therewith in the usual manner to produce the desired effects in the finished articles.

I claim as my invention:

1. A novel plastic composition composed of vegetable fiber, paraffin, and copal, adapted to be shaped and molded and existing normally in a hard condition.

2. A novel plastic composition composed of paper pulp fiber, paraffin, and copal, adapted to be shaped and molded and existing normally in a hard condition.

3. A novel plastic composition composed essentially of shredded paraffin waste paper, and copal, adapted to be shaped and molded and existing normally in a hard condition.

4. A novel article of manufacture composed of vegetable fiber, paraffin, and copal.

5. A novel article of manufacture composed of paper pulp fiber, paraffin, and copal.

6. A novel article of manufacture composed of shredded paraffin waste paper, and copal.

7. The method of preparing a homogeneous mass of paraffin and resinous substances, consisting in incorporating the paraffin with vegetable fiber and then melting this product with the resinous substances.

8. The method of preparing a homegeneous mass of paraffin and copal, consisting in mixing shredded paraffin waste paper and copal powder, and melting the mass until a uniform composition is obtained.

Signed at New York, N. Y., this 17th day of November 1916.

AUGUST E. NIENSTADT.

Witnesses:
 MORRIS WEISS,
 ALFRED E. DUBEY.